(12) United States Patent
Hwang et al.

(10) Patent No.: US 10,193,757 B2
(45) Date of Patent: Jan. 29, 2019

(54) NETWORK TOPOLOGY SYSTEM AND METHOD

(71) Applicant: National Cheng Kung University, Tainan (TW)

(72) Inventors: Chi-Chuan Hwang, Tainan (TW); Chi-Hsiu Liang, Taichung (TW); Yu-Tin Chen, Hsinchu (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 151 days.

(21) Appl. No.: 15/076,590

(22) Filed: Mar. 21, 2016

(65) Prior Publication Data

US 2017/0272327 A1    Sep. 21, 2017

(51) Int. Cl.
| | | |
|---|---|---|
| *G06F 15/173* | (2006.01) |
| *H04L 12/24* | (2006.01) |
| *G06F 15/80* | (2006.01) |

(52) U.S. Cl.
CPC ........ *H04L 41/12* (2013.01); *G06F 15/17381* (2013.01); *G06F 15/17387* (2013.01); *G06F 15/803* (2013.01); *H04L 41/04* (2013.01); *H04Q 2213/1304* (2013.01); *Y02D 10/14* (2018.01)

(58) Field of Classification Search
CPC ............... H04L 41/04; G06F 15/17381; G06F 15/17387; G06F 15/803
See application file for complete search history.

(56) References Cited

U.S. PATENT DOCUMENTS

| | | | | |
|---|---|---|---|---|
| 5,343,554 A | * | 8/1994 | Koza ...................... | G06N 3/126 706/13 |
| 2005/0063539 A1 | * | 3/2005 | Langin-Hooper ...... | G06F 7/586 380/44 |
| 2015/0117223 A1 | * | 4/2015 | Lih ........................ | H04L 12/437 370/238 |
| 2015/0117267 A1 | * | 4/2015 | Lih ........................ | H04L 12/437 370/258 |

OTHER PUBLICATIONS

William Dress, "Properties of Lightfleet's Direct Broadcast Optical Interconnect", Lightfleet Corporation, Jun. 15, 2010.
(Continued)

*Primary Examiner* — Tom Y Chang
(74) *Attorney, Agent, or Firm* — Gokalp Bayramoglu

(57) ABSTRACT

A network topology system comprises a plurality of nodes, each of the plurality of nodes having a set of connection rules which is built by the steps of: generating a series of prime number differences; generating a series of communication strategy numbers; extracting as many terms as the number of connecting nodes from a recursive sequences to serve as an index series; generating a series of connection strategy numbers by extracting the Nth terms from the series of communication strategy numbers, wherein N stands for each number of the index series; and generating a series of connecting nodes numbers by calculating the sum of each odd number and each term of the series of connection strategy numbers so as to build the connection rules for each odd-numbered node to connect the nodes numbered in corresponding with the numbers of the connecting nodes number series.

8 Claims, 7 Drawing Sheets

(56) References Cited

OTHER PUBLICATIONS

Timothy Ian Mattox, "Exploiting Sparseness of Communication Patterns for the Design of Networks in Massively Parallel Supercomputers", University of Kentucky UKnowledge, 2006.
Cessna, Joseph B., "The hybrid ensemble smoother (HEnS) & noncartesian computational interconnects", UC San Diego Electronic Theses and Dissertations, eScholarship University of California, 2010.
Michihiro Koibuchi, et al., "A Case for Random Shortcut Topologies for HPC Interconnects", Computer Architecture (ISCA), 2012 39th Annual International Symposium on Computer Architecture, Jun. 9-13, 2012.
Federico Silla, et al., "High performance routing in networks of workstations with Irregular Topology", IEEE Transactions on Parallel and Distributed Systems, vol. 11, No. 7, Jul. 2000.

\* cited by examiner

| Topology name | Graphical representation | A/D |
|---|---|---|
| TOFU-3x3x3 N324K7-10 | | A=4.35 D=9 |
| N=324 K=8 | | A=3.41 D=5 |

FIG. 4A

| Topology name | Graphical representation | A/D |
|---|---|---|
| TOFU-5x5x5 N1500K7-10 | (graphical representation) | A=6.47 D=15 |
| N=1500 K=9 | (graphical representation) | A=4.23 D=6 |

FIG. 4B

| Topology name | Graphical representation | N/K/A/D |
|---|---|---|
| IBM BlueGene/Q N1024K10 | | N=1024 K=10 A=5.00 D=10 |
| N=1024 K=10 | | N=1024 K=10 A=3.63 D=5 |

FIG. 4C

| Topology name | Graphical representation | N/K/A/D |
|---|---|---|
| Motorola's MC68xxx processor N80K2-4 |  | N=80<br>K=4<br>A=4.73<br>D=8 |
| N=80<br>K=4 |  | N=80<br>K=4<br>A=3.59<br>D=6 |

NETWORK TOPOLOGY SYSTEM AND METHOD

BACKGROUND

Technical Field

The present invention relates to the technical field of computer networks, and in particular, to a network topology system and method.

Related Art

High-performance computers or computer systems can provide optimized use of hardware and software, which is achieved by using a processing node including one or more microprocessors and a memory. The computer systems are sometimes referred to as shared multiprocessor systems, and in a shared multiprocessor computer system, processors are regarded as network nodes for interconnection, enabling them to communicate with each other, to share an operating system, resources, data, memory and so on.

In a parallel operation computer system, with increase of the number of computer nodes, network communication between the nodes will increase significantly, and in order to make the communication speed between every two nodes increase, it is possible to use a switch for communication between the nodes. However, the greater the number of nodes is, the more the number of switches used, the number of layers of switches that use a fat tree structure will also increase, thus resulting in that the whole network system has a quite complicated structure and is power-consuming, and the cost of the network system will also increase.

SUMMARY

In view of the foregoing problems, an objective of the present invention is to provide a network topology system and method, of which the topology mathematical calculation is, in a system having multiple nodes, finding a set of node connection rules for nodes and the number of connections between each node and other nodes, to make it possible to construct a network topology formed by all nodes according to the connection rules and the number of connections without using a switch, so that the structure of the whole network system becomes simple and there is no power consumption of the switch; therefore, the cost of the network system will not increase, and moreover, each node achieves the so-called Democratized Dimension through the same form of communication freedom (using the same set of connection rules) and making the number of connections of all the nodes very close.

A first aspect of the present invention provides a network topology system, including:

a plurality of nodes, wherein each node is one of a single core on chip, a processor, a computer, a group of internally optimized group of computers and a computational center, and a connection is made between any starting node and any destination node in the nodes according to a connection rule;

wherein the connection rule is built by the steps of:

generating a series of prime number differences by calculating the differences between adjacent prime numbers in a series of prime numbers:

generating a series of communication strategy numbers by calculating the sum of its number and prior numbers for each term of the series of prime number differences;

extracting as many terms as the number of connecting nodes from a recursive sequences to serve as an index series; generating a series of connection strategy numbers by extracting the Nth terms from the series of communication strategy numbers, wherein N stands for each number of the index series; and generating a series of connecting nodes numbers by calculating the sum of each odd number and each term of the series of connection strategy numbers so as to build the connection rules for each odd-numbered node to connect the nodes numbered in corresponding with the numbers of the connecting nodes number series.

A second aspect of the present invention provides a network topology method, applied to a network topology system, the network topology system including a plurality of nodes, wherein each node is one of a single core on chip, a processor, a computer, a group of internally optimized group of computers and a computational center, the method including the steps of:

making a connection, by the network topology system, between any starting node and any destination node in the nodes according to a connection rule;

wherein the connection rule is built by the steps of:

generating a series of prime number differences by calculating the differences between adjacent prime numbers in a series of prime numbers;

generating a series of communication strategy numbers by calculating the sum of its number and prior numbers for each term of the series of prime number differences;

extracting as many terms as the number of connecting nodes from a recursive sequences to serve as an index series; generating a series of connection strategy numbers by extracting the Nth terms from the series of communication strategy numbers, wherein N stands for each number of the index series; and generating a series of connecting nodes numbers by calculating the sum of each odd number and each term of the series of connection strategy numbers so as to build the connection rules for each odd-numbered node to connect the nodes numbered in corresponding with the numbers of the connecting nodes number series.

BRIEF DESCRIPTION OF THE DRAWINGS

FIGS. 4A to 4D are schematic diagrams of efficiency comparison between the network topology system according to the present invention and various network topology systems.

DETAILED DESCRIPTION

In order to enable those of ordinary skill in the art to further understand the present invention, preferred embodiments of the present invention are listed below to describe constitution contents and effects to be achieved of the present invention in detail in conjunction with the accompanying drawings.

Figure 1:
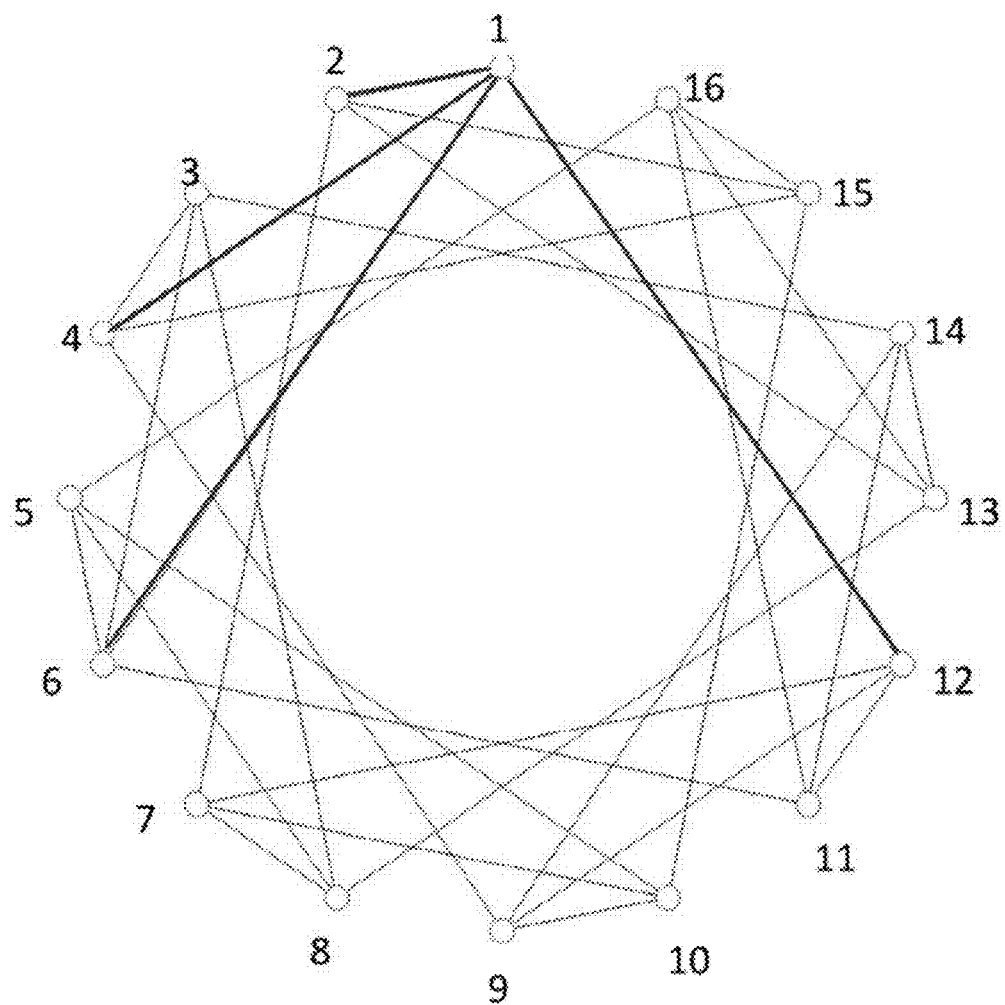
FIG. 1 is a schematic architectural diagram of nodes of a network topology system according to the present invention.

FIG. 1 is a schematic architectural diagram of nodes of a network topology system according to the present invention. In FIG. 1, the network topology system includes a plurality of nodes (node number 1, 2, . . . , 16), each node is a single core on chip, a processor, a computer, a group of internally optimized group of computers or a computational center, and for the nodes in the network topology system, connections are made between any starting node and the plurality of nodes node in the nodes according to a set of connection rules.

The embodiment of the present invention describes communication operations of the network topology system by taking 16 nodes as an example, but the number of the nodes does not limit the present invention; the nodes of the network topology system of the present invention may be up to thousands of or even millions of nodes.

The manner in which the connection rule is built is described as follows. At first, a total number of nodes N and the number of the connecting nodes K are entered, wherein the total number of nodes N indicates the number of nodes of the network topology system, and the number of the connecting nodes K indicates the number of other nodes with which each node can be connected in parallel. In the embodiment, the total number of nodes N is 16, and the number of the connecting nodes K is 4.

Next, a recursive sequence whose number is less than the total number of nodes N is listed, wherein the recursive sequence may be a well-known recursive sequence. A series of prime numbers whose number are prime numbers are listed, for example, 2, 3, 5, 7, 11, 13, 17, 19, . . . . Differences between adjacent prime numbers in the series of prime numbers are calculated, for example, 3−2=1, 5−3=2, 7−5=2, 11−7=4, 13−11=2, 17−13=4, . . . , to generate a series of prime number differences whose numbers are 1, 2, 2, 4, 2, 4, . . . .

The sum of its number and prior numbers for each term of the series of prime number differences is calculated, that is, the sum of numbers in the first position 1 is 1, the sum of numbers in the second position is 1+2=3, the sum of numbers in the third position is 1+2+2=5, the sum of numbers in the fourth position is 1+2+2+4=9, the sum of numbers in the fifth position is 1+2+2+4+2=11, the sum of numbers in the sixth position is 1+2+2+4+2+4=15, . . . , through the above calculation, to generate a series of communication strategy numbers whose numbers are 1(1), 3(2), 5(3), 9(4), 11(5), 15(6), . . . , wherein the figure in the parentheses indicates an index of the position of the number in the series of communication strategy numbers.

Numbers in the third to K+2th (K is 4) positions in the recursive sequence are extracted to serve as an index series; in this embodiment, numbers of the index series are 1, 2, 3, 5.

K numbers in the series of communication strategy numbers are extracted, to generate a series of connection strategy numbers, wherein the K numbers are numbers in the index series corresponding to numbers in the series positions of the series of communication strategy numbers; in this embodiment, numbers in the series of connection strategy numbers are 1(1), 3(2), 5(3), 11(5).

The sum of each odd number and the numbers in the series of connection strategy numbers is calculated, to generate a plurality of series of connecting nodes numbered, so as to build the connection rules for each odd-numbered node to connect the nodes numbered in corresponding with the numbers of the connecting nodes number series; in this embodiment, the node whose odd number is 1 is connected in parallel with nodes numbered 1+1=2, 1+3=4, 1+5=6, 1+11=12 and so on, and the node whose odd number is 3 is connected in parallel with nodes numbered 3+1=4, 3+3=6, 3+5=8, 3+11=14 and so on, . . . (as shown in FIG. 1).

In a network topology system with the total number of nodes N, the number of connections of each node which is close to a particular value is found, that is, $K_i \rightarrow K$, i=1, 2, . . . , N, wherein $K = \log_2 N$, which has the shortest average distance, referred to as topology optimization.

In a network topology with the total number of nodes N, the longest distance between all nodes may be expressed as the following distance matrix:

$$D = \begin{bmatrix} d_{11} & \cdots & d_{N1} \\ \vdots & \ddots & \vdots \\ d_{1N} & \cdots & d_{NN} \end{bmatrix}$$

wherein $d_{ij}$ is the longest distance between nodes i and j, and $d_{ij}=0$, that is, diagonal elements are all 0.

An average distance A of one topology is defined as follows:

$$A = \frac{\sum_{i,j,i\neq j} d_{ij}}{N*(N-1)},$$
$$i, j = 1, 2, \ldots, N$$

wherein $d_{ij}$ indicates the longest distance between any two nodes i and j. For example, if the total number of nodes N is 4, the number of connecting nodes K is 2, and the distance matrix is expressed as:

$$\begin{bmatrix} 0 & 1 & 2 & 1 \\ 1 & 0 & 1 & 2 \\ 2 & 1 & 0 & 1 \\ 1 & 2 & 1 & 0 \end{bmatrix}$$

$$A = (1 + 2 + 1 + \ldots + 2 + 1)/(4 \times 3) = 1.33.$$

Each node achieves the so-called Democratized Dimension through the same form of communication freedom (using the same set of node connection rules) and making the number of connections of all the nodes very close, that is, $K_i \rightarrow K$, i=1, 2, . . . , N.

Figure 2:
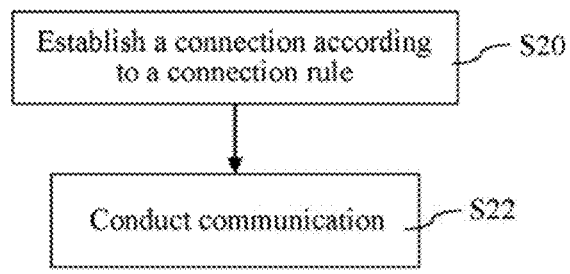
FIG. 2 is a flowchart of a network topology method according to the present invention.

FIG. 2 is a flowchart of a network topology method according to the present invention. Reference is made to the node of FIG. 1 when process steps of FIG. 2 are described.

In FIG. 2, a good connection rule is built to be first used to connect respective nodes in FIG. 1 (step S20).

Figure 3:
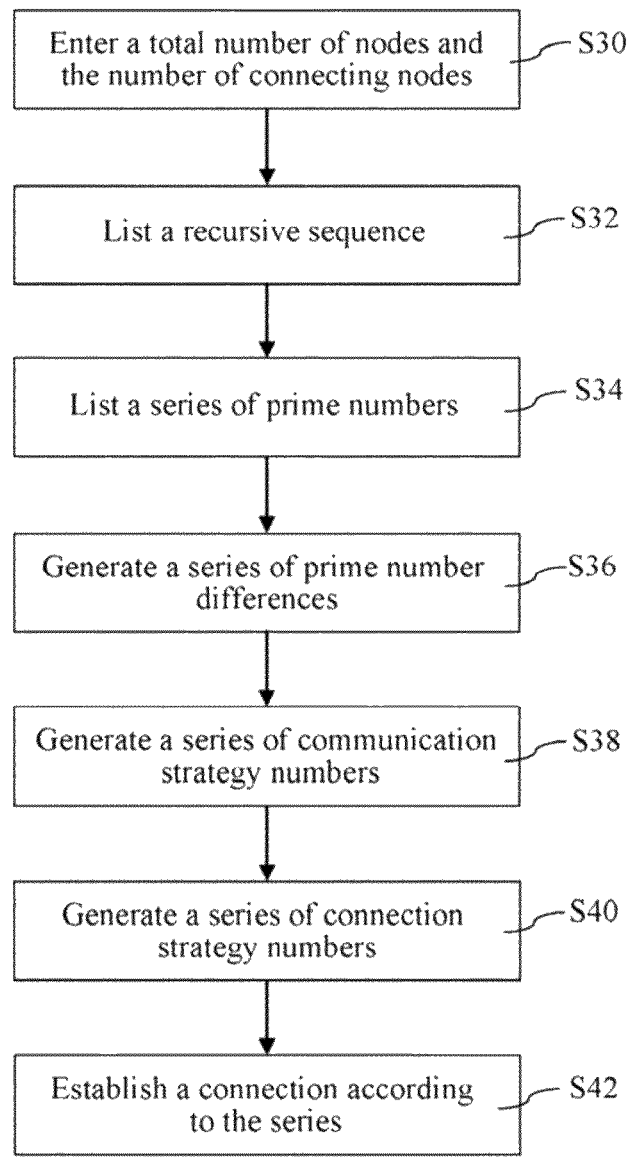
FIG. 3 is a flowchart of a method of building a connection rule according to the present invention.

FIG. 3 is a flowchart of a method of building a connection rule according to the present invention, and steps of building data of a connection rule is as shown by the flowchart in FIG. 3. In FIG. 3, a total number of nodes N and the number of the connecting nodes K are entered; in this embodiment, the total number of nodes N of the network topology system is 16, and the number of the connecting nodes K indicating the number of other nodes with which each node can be connected in parallel is 4 (step S30).

A recursive sequence whose number is less than the total number of nodes N is listed; in this embodiment, the numbers of the recursive sequence are 0, 1, 1, 2, 3, 5, 8, 13 (step S32), wherein the recursive sequence may be a well-known recursive sequence.

A series of prime numbers whose number are prime numbers are listed, for example, 2, 3, 5, 7, 11, 13, 17, 19, . . . (step S34). Differences between adjacent prime numbers in the series of prime numbers are calculated, for example, 3−2=1, 5−3=2, 7−5=2, 11−7=4, 13−11=2, 17–13=4, . . . , to generate a series of prime number differences whose numbers are 1, 2, 2, 4, 2.4, . . . (step S36).

The stun of its number and prior numbers for each term of the series of prime number differences is calculated, to generate a series of communication strategy numbers, for example, in this embodiment, the sum of numbers in the first position 1 is 1, the sum of numbers in the second position is 1+2=3, the sum of numbers in the third position is 1+2+2=5, the sum of numbers in the fourth position is 1+2+2+4=9, the sum of numbers in the fifth position is 1+2+2+4+2=11, the sum of numbers in the sixth position is 1+2+2+4+2+4=15, . . . , through the above calculation, a series of communication strategy numbers whose numbers are 1(1), 3(2), 5(3), 9(4), 11(5), 15(6), . . . are generated, wherein the figure in the parentheses indicates an index of the position of the number in the series of communication strategy numbers (step S38).

Numbers in the third to K+2th (K is 4 in this embodiment) positions in the recursive sequence (0, 1, 1, 2, 3, 5, 8, 13) are extracted to serve as an index series; in this embodiment, numbers of the index series in the third to sixth positions are 1, 2, 3, 5. Next, K numbers in the series of communication strategy numbers are extracted, to generate a series of connection strategy numbers, wherein the K numbers are numbers in the index series corresponding to numbers in the series positions of the series of communication strategy numbers; in this embodiment, numbers in the series of connection strategy numbers are 1(1), 3(2), 5(3), 11(5) (step S40).

The sum of each odd number and the numbers in the series of connection strategy numbers is calculated, to generate a plurality of series of connecting nodes numbered, so as to build the connection rules for each odd-numbered node to connect the nodes numbered in corresponding with the numbers of the connecting nodes number series (step S42), for example, in this embodiment, the node whose odd number is 1 is connected in parallel with nodes numbered 1+1=2, 1+3=4, 1+5=6, 1+11=12 and so on, and the node whose odd number is 3 is connected in parallel with nodes numbered 3+1=4, 3+3=6, 3+5=8, 3+11=14 and so on, . . . (as shown in FIG. 1), and the built connection rules are used to connect the network nodes in FIG. 1.

Referring to FIG. 2 again, the network topology system conducts communication transmission between any starting node and any destination node in the nodes of FIG. 1 (step S22).

Comparison between the above network topology system and a known network topology system is described as follows. In FIG. 4A, it is found by comparing the network topology system of the present invention of which the total number of nodes is 324 and the number of connecting nodes is 8 with Fijitsu's network topology system of TOFU-3×3×3N324K7-10 that the network topology system of the present invention has an average distance A=3.41 and the longest distance D=5, while the Fijitsu's network topology system has an average distance A=4.35 and the longest distance D=9; as the values of the average distance A and the longest distance D of the network topology system of the present invention are both less than the values of the average distance A and the longest distance D of the Fijitsu's network topology system, communication transmission efficiency of the network topology system of the present invention is superior to that of the Fijitsu's network topology system.

Figure 4D:
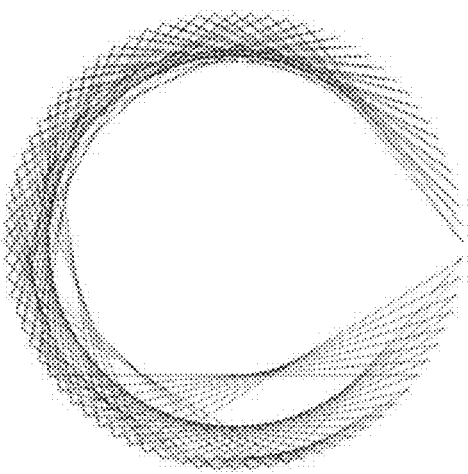
Figure 4D:
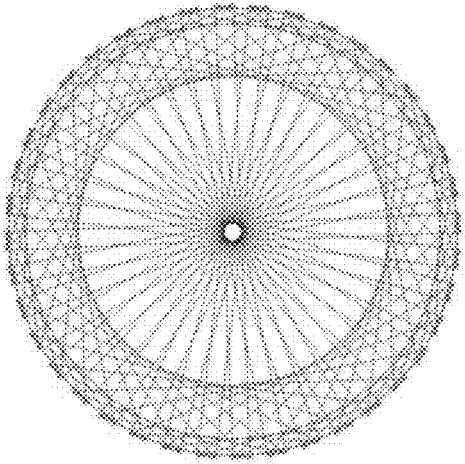

Similarly, in FIG. 4B, the network topology system of the present invention of which the total number of nodes is 1500 and the number of connecting nodes is 9 has an average distance A=4.23 and the longest distance D=6, and Fijitsu's network topology system of TOFU-5×5×5N1500K7-10 has an average distance A=6.47 and the longest distance D=15; in FIG. 4C, the network topology system of the present invention of which the total number of nodes is 1024 and the number of connecting nodes is 10 has an average distance A=3.63 and the longest distance D=5, and IBM's network topology system of BlueGene/QN1024K10 has an average distance A=5.00 and the longest distance D=10; in FIG. 4D, the network topology system of the present invention of which the total number of nodes is 80 and the number of connecting nodes is 4 has an average distance A=3.59 and the longest distance D=6, and Motorola's network topology system of MC68xxxprocessorN80K2-4 has an average distance A=4.73 and the longest distance D=8.

It is found from FIGS. 4B to 4D that the communication transmission efficiency of the network topology system of the present invention is superior to that of Fijitsu's network topology system of TOFU-5×5×5N1500K7-10, IBM's network topology system of BlueGene/QN1024K10 and Motorola's network topology system of MC68xxxprocessorN80K2-4.

The present invention provides a network topology system and method, which have the following advantages: the topology mathematical calculation is, in a system having multiple nodes, finding a set of node connection rules for nodes and the number of connections between each node and other nodes, to make it possible to construct a network topology formed by all nodes according to the connection rules and the number of connections without using a switch, so that the structure of the whole network system becomes simple and there is no power consumption of the switch: therefore, the cost of the network system will not increase, and moreover, each node achieves the so-called Democratized Dimension through the same form of communication freedom (using the same set of connection rules) and making the number of connections of all the nodes very close.

Although the present invention has been described as above with reference to preferred embodiments and exemplary drawings, the embodiments should not be construed as limitations. Various modifications, omissions and variations made by person skilled in the art to the form and contents of the specific embodiments shall not depart from the scope claimed by the claims of the present invention.

What is claimed is:

1. A network topology system, comprising:
a plurality of nodes, wherein each node is one of a single core on chip, a processor, a computer, a group of internally optimized group of computers and a computational center, and a connection is made between any starting node and any destination node in the nodes according to a connection rule;
wherein the network topology system is formed without using a switch for the connection;
wherein the connection rule is built by the steps of:
generating a series of prime number differences by calculating the differences between adjacent prime numbers in a series of prime numbers;
generating a series of communication strategy numbers by calculating the sum of its number and prior numbers for each term of the series of prime number differences;
extracting as many terms as the number of connecting nodes from a recursive sequences to serve as an index series; generating a series of connection strategy numbers by extracting the Nth terms from the series of communication strategy numbers, wherein N stands for each number of the index series; and generating a series of connecting nodes numbers by calculating the sum of each odd number and each term of the series of connection strategy numbers so as to build the connection rules for each odd-numbered node to connect the nodes numbered corresponding to the numbers of the connecting nodes number series.

2. The network topology system according to claim 1, wherein the connection rule is built further by the steps of:

entering a total number of nodes and the number of the connecting nodes;

listing the recursive sequence whose number is less than the total number of nodes; and listing the series of prime numbers whose number is prime numbers.

3. The network topology system according to claim 1, wherein as many terms as the number of connecting nodes are extracted from the third position of the recursive sequences to serve as an index series.

4. The network topology system according to claim 2, wherein as many terms as the number of connecting nodes are extracted from the third position of the recursive sequences to serve as an index series.

5. A network topology method, applied to a network topology system, the network topology system comprising a plurality of nodes, wherein each node is one of a single core on chip, a processor, a computer, a group of internally optimized group of computers and a computational center, the method comprising the steps of:

making a connection, by the network topology system, between any starting node and any destination node in the nodes according to a connection rule;

wherein the connection rule is built by the steps of:

generating a series of prime number differences by calculating the differences between adjacent prime numbers in a series of prime numbers;

generating a series of communication strategy numbers by calculating the sum of its number and prior numbers for each term of the series of prime number differences;

extracting as many terms as the number of connecting nodes from a recursive sequence to serve as an index series; generating a series of connection strategy numbers by extracting the Nth terms from the series of communication strategy numbers, wherein N stands for each number of the index series; and generating a series of connecting node numbers by calculating the sum of each odd number and each term of the series of connection strategy numbers so as to build the connection rules for each odd-numbered node to connect the nodes numbered in corresponding with the numbers of the connecting nodes number series;

wherein the connection is formed without using a switch in the network topology system.

6. The network topology method according to claim 5, wherein the connection rule is built further by the steps of:

entering a total number of nodes and the number of the connecting nodes;

listing the recursive sequence whose number is less than the total number of nodes; and listing the series of prime numbers whose number is prime numbers.

7. The network topology method according to claim 5, wherein as many terms as the number of connecting nodes are extracted from the third position of the recursive sequences to serve as an index series.

8. The network topology method according to claim 6, wherein as many terms as the number of connecting nodes are extracted from the third position of the recursive sequences to serve as an index series.

* * * * *